United States Patent
Dom et al.

(10) Patent No.: US 10,451,046 B2
(45) Date of Patent: Oct. 22, 2019

(54) ENERGY CELL FOR CONVERTING HEAT INTO OTHER FORMS OF ENERGY AND APPARATUS FOR THE RECOVERY OF HEAT THAT MAKES USE OF SUCH AN ENERGY CELL

(71) Applicant: ATLAS COPCO AIRPOWER, NAAMLOZE VENNOOTSCHAP, Wilrijk (BE)

(72) Inventors: Johan Julia J. Dom, Wilrijk (BE); Bengt Erik Ostlund, Sollentuna (SE); Anders Petter Viberg, Nacka (SE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 403 days.

(21) Appl. No.: 15/314,857

(22) PCT Filed: Jun. 5, 2015

(86) PCT No.: PCT/BE2015/000031
§ 371 (c)(1),
(2) Date: Nov. 29, 2016

(87) PCT Pub. No.: WO2015/184516
PCT Pub. Date: Dec. 10, 2015

(65) Prior Publication Data
US 2017/0191469 A1    Jul. 6, 2017

(30) Foreign Application Priority Data

Jun. 6, 2014  (BE) .................................. 2014/0435
Nov. 28, 2014  (EP) .................................. 14004021

(51) Int. Cl.
F03G 7/06    (2006.01)

(52) U.S. Cl.
CPC ...................................... *F03G 7/06* (2013.01)

(58) Field of Classification Search
CPC . F03G 7/06; F01K 25/00; F01K 25/04; F01K 25/06
(Continued)

(56) References Cited

U.S. PATENT DOCUMENTS 4,341,075 A * 7/1982 Backlund .................. F03G 7/04
                                                    60/531
4,553,394 A   11/1985 Weinert
(Continued)

FOREIGN PATENT DOCUMENTS

DE    3126228 A1    3/1983
EP    1136698 A1    9/2001
(Continued)

OTHER PUBLICATIONS

International Search Report (ISR) dated Mar. 2, 2016, for PCT/BE2015/000031.
(Continued)

*Primary Examiner* — Mark A Laurenzi
*Assistant Examiner* — Mickey H France
(74) *Attorney, Agent, or Firm* — Bacon & Thomas, PLLC (57) ABSTRACT

An energy cell that is provided with a pressure vessel with two chambers separated by a membrane, respectively a first chamber filled with a phase-change material and a second chamber filled with hydraulic fluid, whereby this energy cell is provided with means to be able to heat and cool the phase-change material alternately, coupled with a volume change, whereby the second chamber is provided with a passage that acts as an input and/or output for the hydraulic fluid, whereby the membrane is stretched elastically upon a phase change whereby the volume in the first chamber increases.

21 Claims, 7 Drawing Sheets

(58) Field of Classification Search
USPC .................. 60/516, 527, 530, 508, 509, 515
See application file for complete search history.

(56) References Cited

U.S. PATENT DOCUMENTS

| | | | |
|---|---|---|---|
| 5,375,983 A * | 12/1994 | Engels | F03G 7/06 |
| | | | 417/379 |
| 5,375,989 A | 12/1994 | Tsutsumi | |
| 2006/0278263 A1 | 12/2006 | Kim et al. | |
| 2011/0024075 A1 | 2/2011 | Ostlund | |
| 2011/0252783 A1* | 10/2011 | Ingvast | F03G 7/06 |
| | | | 60/527 |
| 2013/0264393 A1 | 10/2013 | Onishi | |

FOREIGN PATENT DOCUMENTS

| | | | |
|---|---|---|---|
| FR | 1567351 A | 5/1969 | |
| WO | 2010/074616 A1 | 7/2010 | |

OTHER PUBLICATIONS

Written Opinion dated Mar. 2, 2016, for PCT/BE2015/000031.
Chinese Office Action in related Chinese Application No. 201580030047.5, dated Jul. 26, 2018.

* cited by examiner

ENERGY CELL FOR CONVERTING HEAT INTO OTHER FORMS OF ENERGY AND APPARATUS FOR THE RECOVERY OF HEAT THAT MAKES USE OF SUCH AN ENERGY CELL

The present invention relates to an energy cell for converting heat into hydraulic, mechanical or electrical energy.

More specifically the invention relates to an energy cell that makes use of the properties of a phase-change material whose volume changes by definition upon each change of phase from a solid to a liquid phase and vice versa, and whereby the volume changes are used as a driving force for generating mechanical, hydraulic or other forms of energy.

BACKGROUND OF THE INVENTION

Such an energy cell is known from US 2011/0024075, for example, in which an energy cell is described in the form of a cylinder and a movable piston in the cylinder that encloses a chamber in the cylinder that is filled with such a phase-change material, which expands upon the transition from a solid to a liquid state due to heating, and thereby moves the piston in the cylinder, whereby this movement can be used to exert a mechanical force.

Due to the alternating heating and cooling of the phase-change material in the cylinder, the phase-change material can be made to melt and solidify alternately and thus expand and contract in volume, which results in an in-and-out movement of the piston, whereby this movement can be converted into a motion for driving a motor or other device.

Another example of an energy cell is known from the international patent application WO 2010/074616 in which an energy cell is described in the form of a cylindrical pressure vessel with an elastic bladder therein that is filled with a hydraulic fluid, and which extends axially through the pressure vessel in a space surrounded by a casing of phase-change material with which the space between the pressure vessel and the bladder is filled. Upon a volume increase of the phase-change material, hydraulic fluid is squeezed out of the aforementioned bladder and the volume displacement of the hydraulic fluid arising therefrom is used to generate hydraulic energy.

Such an energy cell is more efficient than the construction in the form of a piston-cylinder as there are no friction losses when an elastic bladder squeezes together.

A disadvantage of an energy cell as described in WO 2010/074616 is that the diameter of the bladder undergoes relatively large changes as a result of volume changes, which results in relatively high stresses in the material of the bladder and in time results in a short lifetime of the bladder.

Another disadvantage is that when the bladder squeezes together, folds can occur that can weaken the bladder locally or even close off parts of the bladder, such that the hydraulic fluid in these parts is prevented from escaping, such that particularly high pressures can be built up in these parts that do not contribute to the conversion into useful hydraulic energy, and which constitute a risk of the bladder tearing.

Another disadvantage is that the construction of such an energy cell is relatively complex and that the assembly and replacement of the components is relatively complicated and takes up a lot of time.

SUMMARY OF THE INVENTION

The purpose of the present invention is to provide a solution to one or more of the aforementioned and other disadvantages.

To this end the invention concerns an energy cell for converting heat into hydraulic, mechanical or electrical energy, whereby this energy cell is provided with a pressure vessel with two chambers therein that are separated from one another by an impermeable and elastic membrane, respectively a first chamber that is filled with a phase-change material whose volume changes upon each phase change from a solid to a liquid phase and vice versa, and a second chamber that is filled with a hydraulic fluid when the energy cell is used, whereby the energy cell is provided with means to be able to heat and cool the phase-change material alternately in order to be able to make the phase-change material change alternately from the solid to the liquid phase and vice versa, each time coupled with a volume change of the first and the second chamber, whereby the second chamber is provided with at least one passage that can act as an input and/or output for the hydraulic fluid upon each volume change of the second chamber, with the characteristic that the energy cell is constructed such that the membrane is stretched elastically upon a phase change of the phase-change material, whereby the volume of the phase-change material in the first chamber increases.

An advantage of an energy cell according to the invention is that no undesired folds can occur upon the expansion of the phase-change material.

Moreover, the size of the membrane is not limited by the relatively small available space in the interior of the energy cell, as is the case with the known energy cell described in WO 2010/074616, such that the stresses in the material of the membrane can be distributed over a larger area such that the stresses can be reduced for the same volume change of the phase-change material and the lifetime of the membrane can be increased as a result.

In a practical embodiment of an energy cell according to the invention, the pressure vessel is partly formed by a first tube and the membrane is constructed as a second tube that is affixed concentrically in the first tube, whereby the first chamber that is filled with a phase-change material is surrounded by the membrane, and the second chamber that is provided to be filled with a hydraulic fluid extends around the membrane between the housing and the membrane.

The phase-change material is thus in the core of the energy cell and upon a volume increase pushes the hydraulic fluid, for example oil, that is around the membrane, to the outside.

Because the hydraulic fluid is on the outside of the tubular membrane, a smaller expansion of the diameter of the membrane is required for the same volume displacement of the hydraulic fluid, which leads to lower stresses in the membrane.

In this practical embodiment both chambers are preferably bounded by two covers that are held in the pressure vessel at a distance from one another, and of which preferably at least one cover, and preferably both covers, is or are detachable and whereby the free edges of the membrane are held in a sealing way in these covers or between the covers and the housing.

In this way the assembly and replacement or maintenance of the components is particularly easy and quick.

In this respect it is preferable to construct at least one cover, and preferably both covers, from two parts with a first part that is held in the pressure vessel and a second part that is fastened in or against the first part with clamping of an aforementioned edge of the membrane between the first and the second part to form a seal between the two chambers, which makes the assembly and replacement of components even easier.

A cheaper solution is a cover made from a single part, whereby upon assembly the edge of the membrane is clamped between the cover and the wall of the pressure vessel.

In order to prevent the membrane undergoing undesired deformations, the membrane can be provided with ribs in certain places on its outer periphery that act as spacers as it were between the membrane and the inside wall of the pressure vessel so as to prevent the hydraulic fluid, upon an expansion of the phase-change material, being trapped in certain zones between the membrane and the pressure vessel with no way out to an output.

These ribs also act as reinforcing ribs for the membrane.

In the same way the inside wall of the pressure vessel can also be provided with such ribs.

Preferably the aforementioned means to be able to alternately heat and/or cool the phase-change material are formed by a heat exchanger with tubes that extend through the phase-change material and which are provided to be affixed on a supply and an outlet of a hot medium and/or a supply and outlet of a cold medium.

This has the advantage that use can be made of the heat that can be recovered from waste flows that are often produced as a by-product of an industrial process in the form of water or similar, and which is generally lost as unusable heat as the temperature of these waste flows is often insufficient to recover energy in a cost-effective way with the existing energy recovery systems.

In this respect it is useful to select a phase-change material with the lowest possible melting temperature that is preferably between 25° C. and 95° C., and preferably below 60° C.

In this way heat can also be recovered from waste flows with a low temperature, for example below 60° C.

Paraffin or wax is a suitable phase-change material for the intended application, which, depending on the type of paraffin or wax has a low melting temperature, for example around 45° C., and whose volume increases substantially upon the transition from the solid to the liquid phase and preferably occupies its original volume again upon solidification.

The invention also relates to a device for recovering heat from a hot medium and the conversion thereof into hydraulic, mechanical or electrical energy, whereby the device comprises at least one energy cell with a tube heat exchanger as described above, whose second chamber is connected to a hydraulic circuit to drive a hydraulic consumer such as a motor or cylinder, and the heat exchanger in the first chamber is connected via a valve system to a circuit with a supply of a cold medium whose supply temperature is below the melting temperature of the phase-change material, and to a circuit with a supply of a hot medium whose supply temperature is above the melting temperature of the phase-change material, whereby the valve system is such that the cold medium and hot medium are alternately driven through the heat exchanger for a certain period.

With such a device it is possible to convert the thermal energy of a waste flow into useful hydraulic, mechanical or electrical energy.

BRIEF DESCRIPTION OF THE DRAWINGS

With the intention of better showing the characteristics of the invention, a few preferred embodiments of an energy cell according to the invention are described hereinafter by way of an example, without any limiting nature, with reference to the accompanying drawings, wherein.

DETAILED DESCRIPTION OF THE INVENTION

Figure 1:
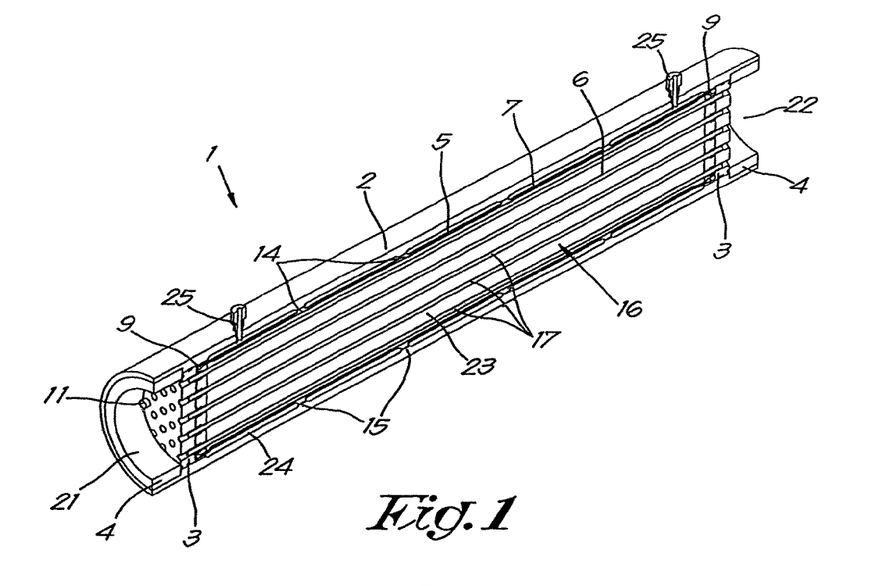
FIG. 1 schematically shows a perspective view of an energy cell according to the invention cut in half.

In this case, the energy cell 1 shown in FIG. 1 is composed of a cylindrical pressure vessel 2 with a detachable cover 3 at both ends, which in this case is held at a distance between the two covers 3 by a retaining ring 4 in the form of a nut in the pressure vessel 2.

The pressure vessel 2 is made to be able to withstand very high pressures, for example pressures up to 10,000 kPa (1000 bar) depending on the desired pressures in a certain application.

Figure 2:
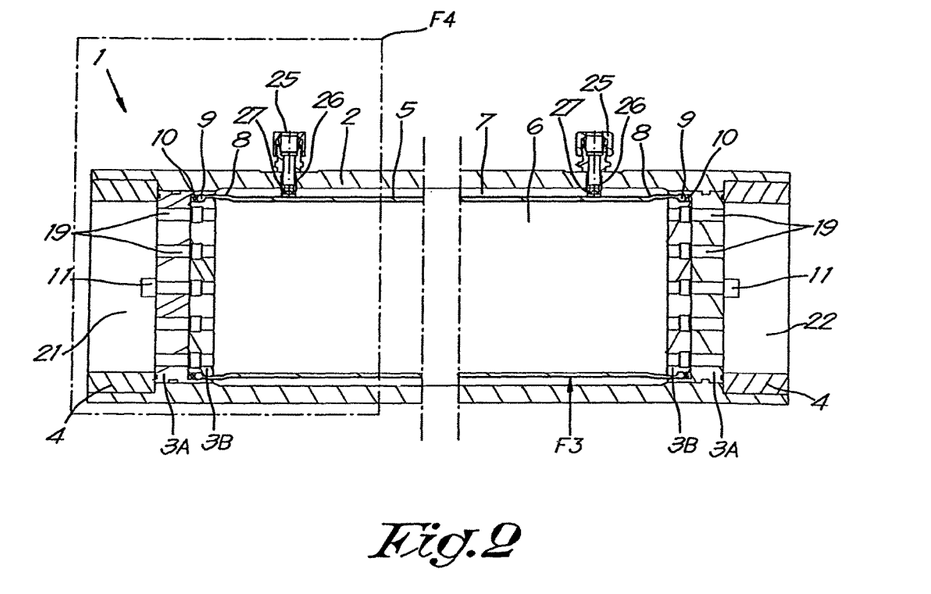
FIG. 2 shows a cross-section of the energy cell of FIG. 1, but with a partial omission.

The space that is delimited by the pressure vessel 2 and by the covers 3 is divided into two chambers by means of a cylindrical membrane 5, respectively a first chamber 6 that is surrounded by the membrane 5 itself, and a second chamber 7 that extends around the membrane 5 between the pressure vessel 2 and the membrane 5, as can best be seen in FIG. 2.

The membrane 5 is made of an impermeable elastic material such as rubber, for example nitrile rubber, or an elastomer or composite material or similar, and is held by a free edge 8 in a sealing way at each end in a cover 3 concerned.

Figure 4:
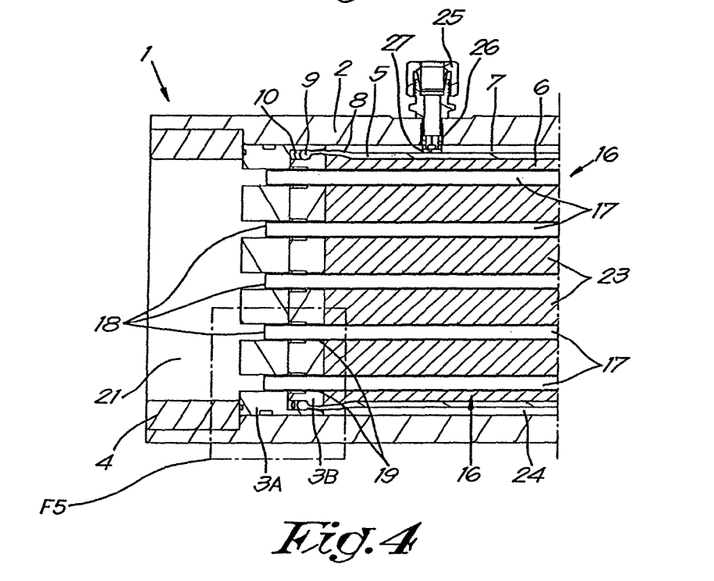
FIG. 4 shows the cross-section indicated in FIG. 2 by the box F4 on a larger scale, this time without omission.
Figure 5:
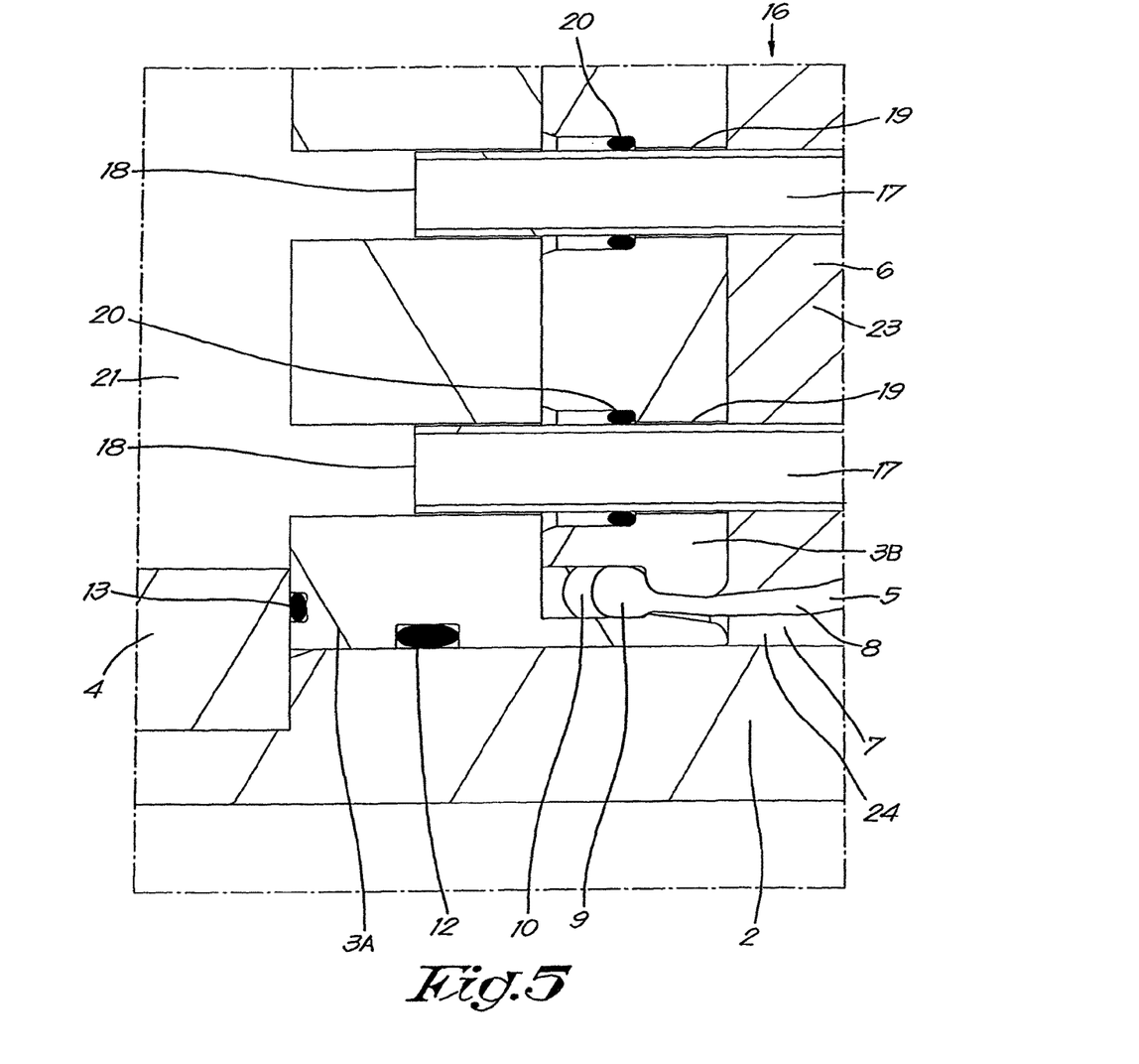
FIG. 5 shows the section indicated in FIG. 4 by the box F5 on an even larger scale.

To this end the aforementioned edges 8 of the membrane 5 are provided with a thickening 9 that can act as an integrated seal, and the covers 3, in the embodiment of FIGS. 4 and 5, are made of two parts with a first part 3A that is held by the aforementioned retaining ring 4 in the pressure vessel 2, and a second part that is fastened in or against the first part with clamping of an aforementioned edge 8 with thickening 9 of the membrane 5 in a chamber 10 that is enclosed between the two parts 3A and 3B.

The second part 3B of each cover 3 is clamped against the first part 3A by means of bolts 11 or similar.

Seals 12 and 13 are provided between the cover 3 and the pressure vessel 2 and the retaining ring 4.

Figure 3:
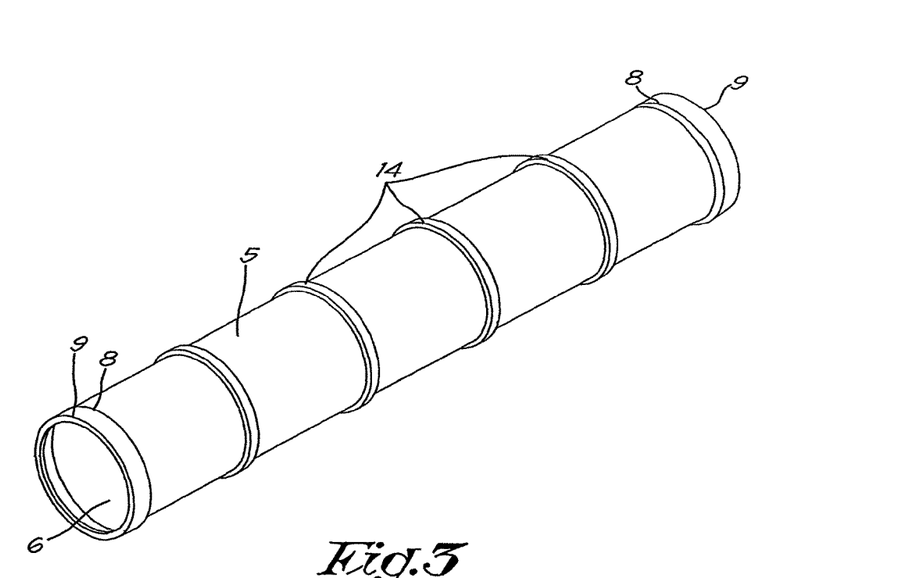
FIG. 3 shows the membrane indicated in FIG. 2 by arrow F3.

On the outside oriented towards the second chamber 7 the membrane 5 is provided with one or more ribs 14, in this case peripheral ribs 14, of a certain thickness that can act locally as spacers between the membrane 5 and the pressure vessel 2, and which also act as reinforcing ribs 14 of the membrane 5. In the example shown, the ribs 14 and the membrane 5 are made from one piece of the same material, although this is not strictly necessary.

In the same way the pressure vessel 2 is provided with ribs 15 of a certain thickness on the inside oriented towards the membrane 5, whereby these ribs 15 are preferably also constructed as peripheral ribs 15 and are preferably provided opposite corresponding ribs 14 of the membrane 5.

The energy cell 1 is further provided with a tube heat exchanger 16 in the form of a bundle of tubes 17 that extend axially through the first chamber 6 and which are held at their ends 18 by means of a sealing O-ring 20 in the passages 19 in the respective covers 3.

The space around the tubes 17 in the first chamber 6 is filled with a phase-change material 23 which, when the energy cell 1 is not used, is in a solid state as shown in FIG. 4, and which in this state occupies a volume that is just sufficient to fill the first chamber 6 when the energy cell is empty and not in use, or is somewhat larger than this empty volume of the first chamber 6 so that in this state the membrane is not or only slightly tensioned in the radial direction.

The tubes 17 form a link between the two ends 21 and 22 of the pressure vessel 2, whereby these ends 21 and 22 can act as an inlet and/or outlet for a cold or hot medium that can be guided through it in order to heat or cool the phase-change material 23 in order to make this phase-change material 23 melt or solidify.

Preferably the tubes 17 are provided on their outside with radially-oriented fins, that are not shown in the drawings, and which are intended to increase the heat-transferring area between the tubes 17 and the phase-change material 23. Moreover, the fins as it were form the skeleton to support the phase-change material 23. The distance between the radially-oriented fins can be constant or variable depending on the application.

The tubes can be provided or otherwise with internal fins on the inside that are intended, for example, to increase the heat-transferring area between the medium in the tubes and the tubes or to make the medium eddy or similar, and as it were generate microchannels such that the turbulent heat transfer is better.

The phase-change material 23 is preferably a material with a low melting temperature that is between 25° C. and 95° C., or better with a melting temperature of the medium that is below 60° C. in order to be able to melt the phase-change material 23 at low temperatures of the medium.

An example of a suitable phase-change material 23 is paraffin or wax whose volume in the molten state is substantially greater than in the solid state.

When the energy cell is in use, the second chamber 7 is filled with a hydraulic fluid 24 originating from a hydraulic circuit that is hydraulically connected to the second chamber 7 by two connecting nipples 25 that are each screwed in a passage 26 of the pressure vessel 2, and which are provided with a cap 27 that prevents the membrane 5 from being able to be pushed in the radial direction from the pressure vessel 2 in the nipple 25 or passage 26.

The membrane 5 acts as an impermeable separation between the phase-change material in the first chamber 6 and the hydraulic fluid in the second chamber 7.

The use of an energy cell 1 according to the invention is very simple and is explained hereinafter on the basis of FIG. 7 in which the energy cell 1 is shown as forming part of a device 28 according to the invention for recovering heat from a supply A of a hot medium that has a temperature that is a greater than the melting temperature of the phase-change material 23.

This supply A of hot medium is connected via a valve system 29 to end 21 of the energy cell 1, while the other end 22 of the energy cell 1 is connected to an outlet B for the hot medium after it has been driven through the tube heat exchanger 16 of the energy cell 1.

Similarly the energy cell 1 is connected via the aforementioned valve system 29 to a supply C for a cold medium and an outlet D for this same medium after its passage through the heat exchanger 16.

The cold medium that is supplied has a temperature that is below the melting temperature of the phase-change material 23.

The valve system 29 is such that the cold medium and the hot medium can be driven alternately through the heat exchanger 16 for a certain period.

The energy cell 1 is also connected via the connecting nipples 25 and another valve system 30 to a hydraulic circuit 31 to drive a hydraulic consumer 32, which is presented here, by way of an example, as a hydraulic motor 33 for driving an electric generator 34.

The valve system 30 is arranged such that the fluid always circulates in the same direction in the circuit 31.

The device operates as follows.

Figure 6:
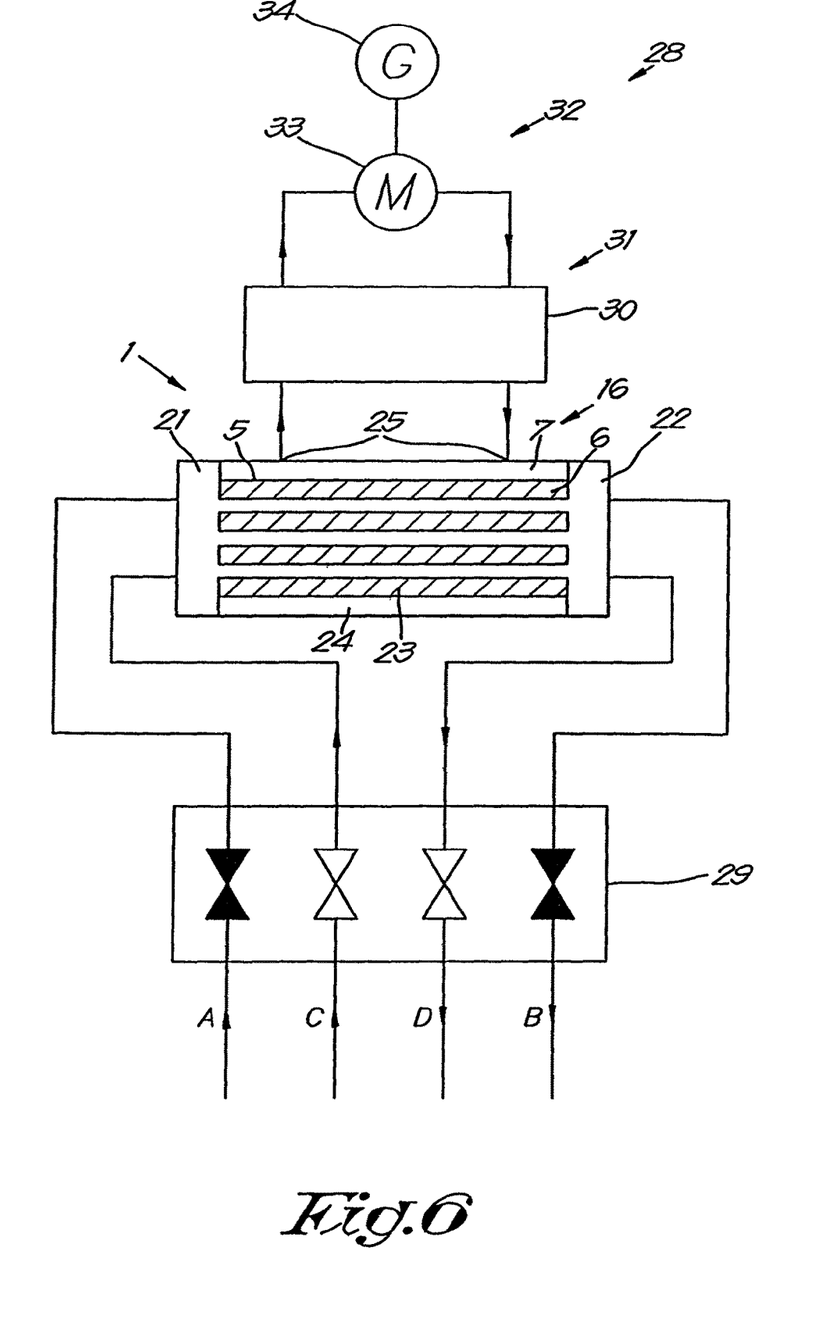
FIG. 6 very schematically shows a device according to the invention that is provided with an energy cell according to the invention with a phase-change material in the solid state.
Figure 7:
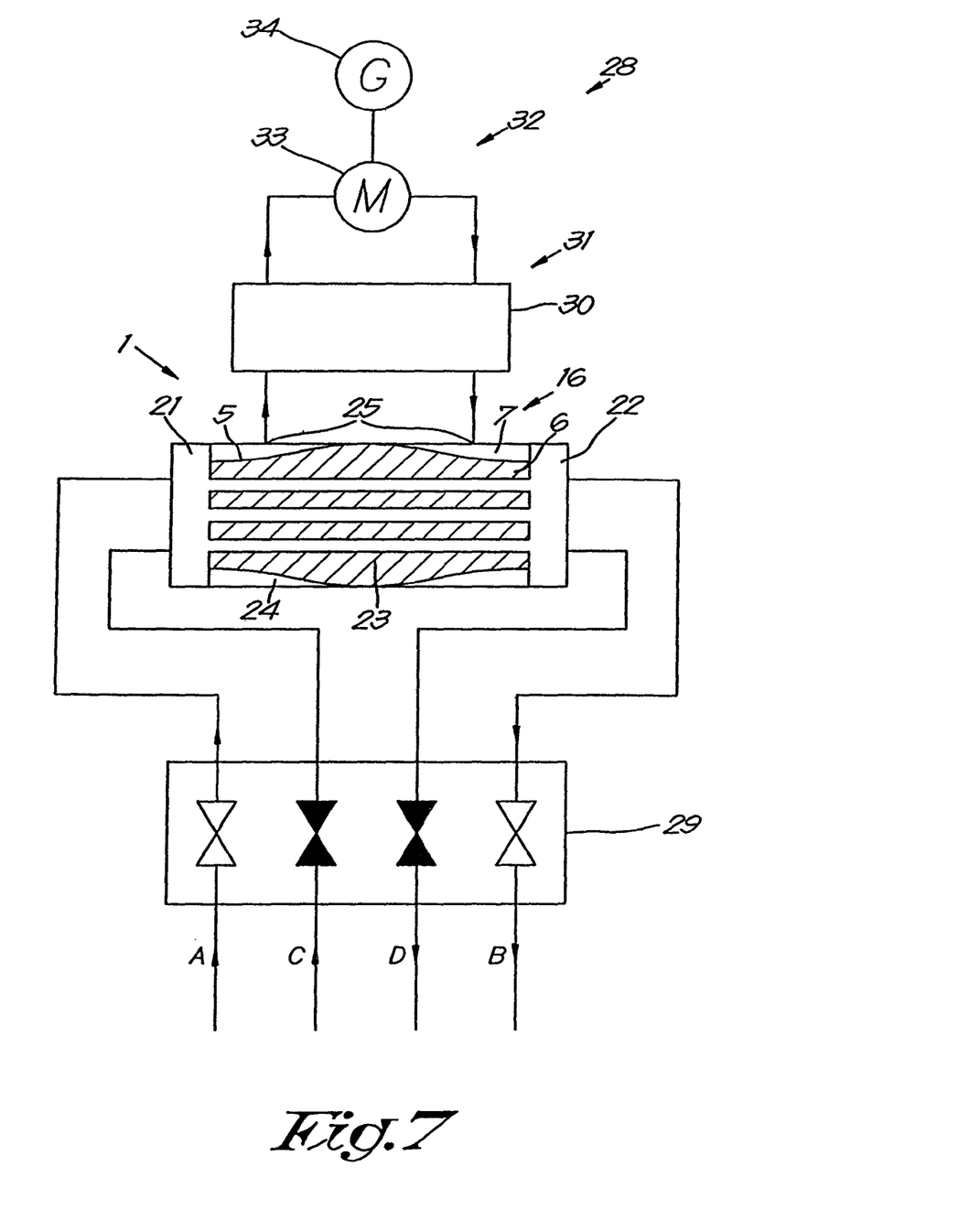
FIG. 7 shows the device of FIG. 6 but with the phase-change material in the molten state.

Starting with a situation as shown in FIG. 6 whereby the phase-change material 23 is in a solid state, for a first period of around fifteen seconds, for example, the valve system 29 is controlled such that during this period hot medium is driven from the supply A through the tube heat exchanger 16 to the outlet B, as shown in FIG. 7 while the supply and outlet of the cold medium is closed.

As a result of the heat of the hot medium, the phase-change material 23 is heated up and made to melt such that the volume of the phase-change material 23 increases and as a result the membrane 5 is pushed away radially such that the volume of the second chamber 7 becomes smaller and the hydraulic fluid is pressed out of this chamber 7 into the circuit 31 at a pressure that depends on the hydraulic resistance of this circuit, and in particular on the load demanded by the consumer 32.

During a subsequent period, as shown in FIG. 6, instead of the hot medium the cold medium is driven through the heat exchanger 16 by a suitable control of the valve system 29.

As a result the molten phase-change material 23 solidifies again and decreases in volume, such that the hydraulic fluid can flow back from the circuit 31 to the energy cell.

In this way the energy cell 1 acts as a beating heart as it were in order to alternately supply the consumer 32 with hydraulic oil.

In practice a battery of a number of energy cells 1 is always connected to the circuit 31, whereby the valve system 29 will ensure that a proportion of the energy cells 1 are supplied, simultaneously and for equal periods, with hot medium and another proportion are supplied with a cold medium and that these cells are alternately and simultaneously switched over from cold to hot medium or vice versa, such that there are always cells that drive hydraulic fluid to the consumer 32 and it can always be driven in the same direction with greater regularity.

Figure 8:
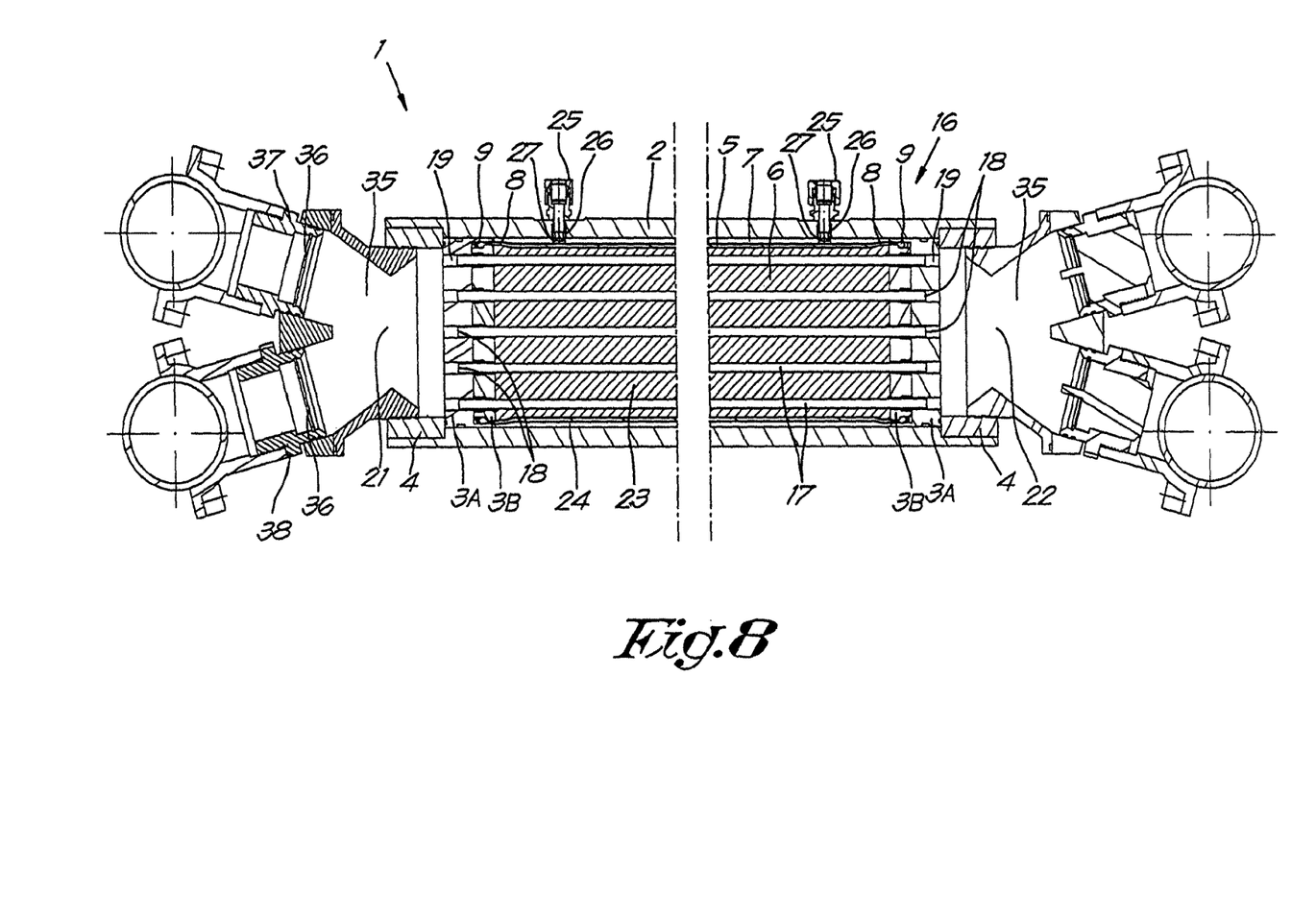
FIG. 8 shows a cross-section of an alternative embodiment of an energy cell according to the invention.

FIG. 8 shows a variant of an energy cell whereby a part of the valve system 29 is integrated in a double connecting piece 35 at each of the ends 21 and 22 of the energy cell 1 in the form of a non-return valve 36 in each of two connections 37 and 38 that are provided in each connecting piece 35 for connection to a hot and a cold circuit.

Figure 9:
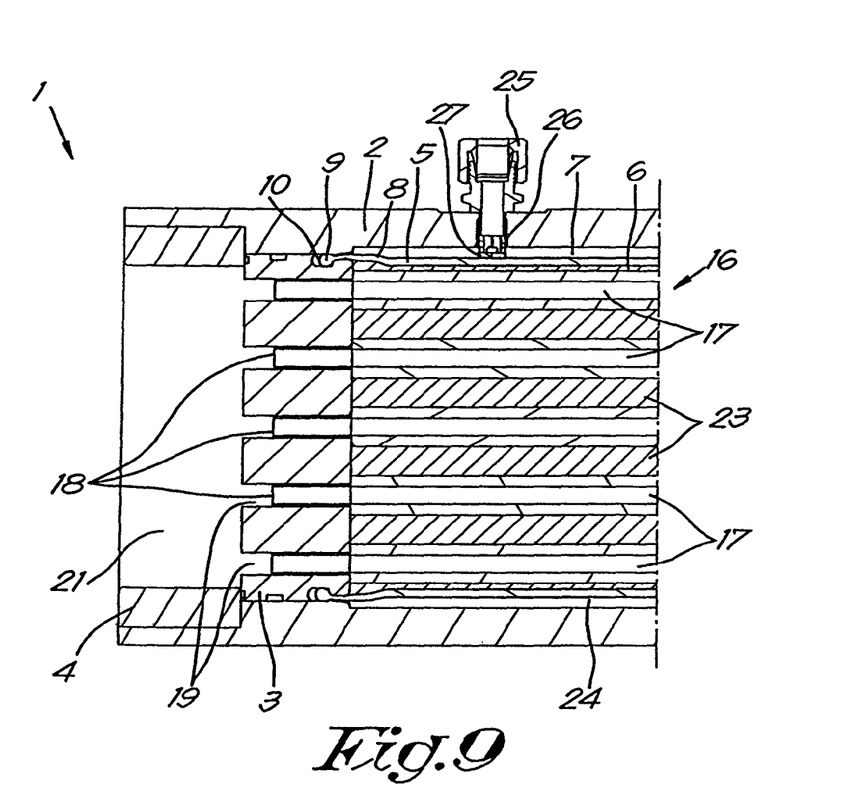
FIG. 9 shows a cross-section such as that of FIG. 4, but for a variant embodiment of an energy cell according to the invention.

FIG. 9 shows a variant of an embodiment of an energy cell 1 whereby in this case a cover is constructed as a single component and whereby the edge of the membrane 5 is clamped in between the wall of the pressure vessel 2 and the single-component cover 3 in a hollowed chamber 10 for this purpose.

Although in the example shown the pressure vessel 2 and the membrane 5 are constructed as coaxial cylinders, other forms are not excluded that ensure that the membrane 5 is stretched elastically upon an expansion of the phase-change material 23.

Instead of using a phase-change material 23 that expands upon melting, it is not excluded using a phase-change material that contracts upon melting.

It is also not excluded that instead of a tube heat exchanger 16, other means are used to alternately heat and cool the phase-change material 23.

For the rest, it is not excluded that the tubes 17 are not straight tubes but are folded into U-shaped tubes, for example, that are held at both ends in the same cover 3, for example.

The present invention is by no means limited to the embodiments described as an example and shown in the drawings, but an energy cell according to the invention can be realised in all kinds of forms and dimensions, without departing from the scope of the invention.

The invention claimed is:

1. An energy cell for converting heat, into hydraulic energy, said energy cell comprising:
   a pressure vessel with two chambers therein that are separated from one another by an impermeable and elastic membrane, respectively a first chamber that is filled with a phase-change material whose volume changes upon each phase change from a solid to a liquid phase and vice versa, and a second chamber that is filled with a hydraulic fluid when the energy cell is used,
   wherein the energy cell is provided with means to be able to heat and cool the phase-change material alternately in order to be able to make the phase-change material change alternately from the solid to the liquid phase and vice versa, each time coupled with a volume change of the first chamber and the second chamber,
   wherein the second chamber is provided with at least one passage that can act as an input and/or output for the hydraulic fluid upon each volume change of the second chamber,
   wherein the energy cell is constructed such that the membrane is stretched elastically upon a phase change of the phase-change material,
   wherein the volume of the phase-change material in the first chamber increases,
   wherein the first and second chamber are bounded by two covers that are held at a distance from one another in the pressure vessel, whereby the free edges of the membrane are held in a sealing way in these covers or between the covers and the wall of the pressure vessel,
   wherein at least one cover is detachable and that one or more seals are provided between each detachable cover and the pressure vessel, and
   wherein one or both detachable covers in the pressure vessel are held in the axial direction by means of a retaining ring.

2. The energy cell according to claim 1, wherein the pressure vessel is partly formed by a first tube, and the membrane is constructed as a second tube that is affixed coaxially in the first tube, whereby the first chamber that is filled with phase-change material is surrounded by the membrane, and the second chamber that is provided to be filled with a hydraulic fluid extends around the membrane between the wall of the pressure vessel and the membrane.

3. The energy cell according to claim 1, wherein at least one cover is made of two parts, with a first part that is held in the pressure vessel and a second part that is fastened in or against the first part with clamping of an aforementioned edge of the membrane between the first part and the second part to form a seal between the two chambers.

4. An energy cell for converting heat, into hydraulic energy, said energy cell comprising:
   a pressure vessel with two chambers therein that are separated from one another by an impermeable and elastic membrane, respectively a first chamber that is filled with a phase-change material whose volume changes upon each phase change from a solid to a liquid phase and vice versa, and a second chamber that is filled with a hydraulic fluid when the energy cell is used,
   wherein the energy cell is provided with means to be able to heat and cool the phase-change material alternately in order to be able to make the phase-change material change alternately from the solid to the liquid phase and vice versa, each time coupled with a volume change of the first chamber and the second chamber,
   wherein the second chamber is provided with at least one passage that can act as an input and/or output for the hydraulic fluid upon each volume change of the second chamber,
   wherein the energy cell is constructed such that the membrane is stretched elastically upon a phase change of the phase-change material,
   wherein the volume of the phase-change material in the first chamber increases,
   wherein the first and second chamber are bounded by two covers that are held at a distance from one another in the pressure vessel, whereby the free edges of the membrane are held in a sealing way in these covers or between the covers and the wall of the pressure vessel,
   wherein at least one cover is made of two parts, with a first part that is held in the pressure vessel and a second part that is fastened in or against the first part with clamping of an aforementioned edge of the membrane between the first part and the second part to form a seal between the two chambers,
   wherein a chamber is enclosed between the first part and the second part of the cover, and that the aforementioned edge of the membrane is provided with a thickening that is held axially in this chamber as an integrated seal.

5. The energy cell according to claim 1, wherein the aforementioned passages, that can act as an input and/or output for the hydraulic fluid in the second chamber, are screened off by a cap or screen that prevents the membrane from being able to be pushed into the passage concerned upon the expansion of the phase-change material.

6. The energy cell according to claim 1, wherein the membrane on the side oriented towards the second chamber is provided with one or more ribs of a certain thickness.

7. The energy cell according to claim 6, wherein in the case of a tubular membrane the ribs are peripheral ribs.

8. The energy cell according to claim 6, wherein the ribs and the membrane are made from one piece of the same material.

9. The energy cell according to claim 1, wherein the pressure vessel is provided with ribs of a certain thickness on the side oriented towards the membrane.

10. The energy cell according to claim 9, wherein in the case of a tubular pressure vessel, the ribs are peripheral ribs.

11. The energy cell according to claim 1, wherein the means for alternately heating and/or cooling the phase-change material are formed by a tube heat exchanger with tubes that extend through the phase-change material and which are provided to be able to be connected on a supply and outlet of a hot medium and/or on a supply and outlet of a cold medium.

12. The energy cell according to claim 11, wherein the tubes extend through the first chamber and through the covers.

13. The energy cell according to claim 11, wherein the aforementioned tubes are provided on their outside with radially-oriented fins to increase the heat-transferring area with the phase-change material.

14. The energy cell according to claim 11, wherein the aforementioned tubes are provided on their inside with internal fins to increase the heat-transferring area between the medium in the tubes and the tubes or to enable the medium to eddy and to generate microchannels as it were such that the turbulent heat transfer is better.

15. The energy cell according to claim 12, wherein the aforementioned tubes extend between an inlet and an outlet, whereby the inlet and the outlet are each provided with two connections, respectively one connection for connection to a hot circuit with a hot medium to make the phase-change material melt and a connection for connection to a cold circuit with a cold medium to make the phase-change material solidify again.

16. The energy cell according to claim 15, wherein each connection is provided with a non-return valve that must enable the tube heat exchanger to be alternately provided with hot and cold medium.

17. The energy cell according to claim 1, wherein the phase-change material is a material with a melting temperature that is between 25° C. and 95° C., preferably with a melting temperature that is below 60° C.

18. The energy cell according to claim 17, wherein the phase-change material can be paraffin or wax.

19. The energy cell according to claim 1, wherein the membrane is made of an elastic material such as rubber, for example nitrile rubber, or an elastomer or a composite material.

20. A device for recovering heat from a hot medium and the conversion thereof into hydraulic, mechanical or electrical energy, wherein the device comprises at least one energy cell according to claim 1, whose second chamber is connected to a hydraulic circuit to drive a hydraulic consumer, and the heat exchanger in the first chamber is connected via a valve system to a supply of a cold medium whose supply temperature is below the melting temperature of the phase-change material, and to a supply of a hot medium whose supply temperature is above the melting temperature of the phase-change material, whereby the valve system is such that the cold medium and hot medium are alternately guided through the heat exchanger for a certain period.

21. The device according to claim 20, wherein it comprises a number of energy cells and the valve system is such that a proportion of the energy cells are provided, simultaneously and for equal periods, with hot medium and another proportion are provided with cold medium and that these cells are simultaneously switched over from cold to hot medium or vice versa.

\* \* \* \* \*